United States Patent [19]

Smati

[11] Patent Number: 5,620,600

[45] Date of Patent: Apr. 15, 1997

[54] IMPROVEMENTS TO SETTLERS

[75] Inventor: M. Adbellatif Smati, Suresnes, France

[73] Assignee: Degremont, Rueil Malmaison, France

[21] Appl. No.: 621,510

[22] Filed: Mar. 25, 1996

Related U.S. Application Data

[63] Continuation of Ser. No. 353,382, Dec. 2, 1994, abandoned.

[30] Foreign Application Priority Data

Dec. 9, 1993 [FR] France .................................. 93 14815

[51] Int. Cl.⁶ .................................................. B01D 21/02
[52] U.S. Cl. ............................................ 210/519; 210/521
[58] Field of Search ................................... 210/110, 137, 210/320, 519, 521, 801

[56] References Cited

U.S. PATENT DOCUMENTS

| | | | |
|---|---|---|---|
| 2,118,157 | 5/1938 | Camp | 210/519 |
| 3,963,624 | 6/1976 | Henderson et al. | 210/521 |
| 4,056,477 | 11/1977 | Ravitts | 210/519 |
| 4,059,529 | 11/1977 | McGivern | 210/519 |
| 4,366,058 | 12/1982 | Wolde-Michael | 210/519 |
| 4,780,206 | 10/1988 | Beard et al. | 210/521 |
| 4,957,628 | 9/1990 | Schulz | 210/519 |
| 5,013,369 | 5/1991 | Kato | 210/320 |
| 5,362,407 | 11/1994 | Elmi | 210/801 |

FOREIGN PATENT DOCUMENTS

| | | |
|---|---|---|
| 576908 | 8/1924 | France . |
| 996122 | 12/1951 | France . |
| 2081123 | 2/1982 | United Kingdom . |

*Primary Examiner*—Neil McCarthy
*Assistant Examiner*—Theodore M. Green
*Attorney, Agent, or Firm*—Pollock, Vande Sande & Priddy

[57] ABSTRACT

Settler, notably for liquid treatment installations, consisting of a settling tank fed with liquid from a feed channel and a spillway, the settler including a system for distributing the liquid consisting of a plurality of gauged openings formed respectively in partitions of liquid inlet chambers fed from the spillway, in such a way that each opening receives a specified fraction of the throughput of the liquid, the openings being staggered in at least two horizontal rows.

4 Claims, 9 Drawing Sheets

IMPROVEMENTS TO SETTLERS

This application is a continuation of U.S. patent application Ser. No. 08/353,382, filed Dec. 2, 1994, abandonded.

FIELD OF THE INVENTION

The present invention relates to enhancements to settlers which are used in particular in installations for treating liquids, in particular water.

BACKGROUND OF THE INVENTION

It is known that the performance of settlers depends in a large measure on their internal hydraulics: the nature of the flow, short-circuits, recirculations, retention time. Some domain specialists evaluate the drop in efficiency due to poor internal hydraulics of the settler at more than 50%.

It is known moreover that this internal hydraulics itself depends on a plurality of factors and in particular on the following factors:

the geometry of the settler;

the device for distributing the liquid at the entrance to the settler;

the device for recovering the treated liquid;

the device for recovering the settled matter and for recycling it;

the relative arrangement of the three devices specified above.

Among the various factors listed above, the distributing device, by virtue of its position at the origin of the chain, is the one which most affects the hydraulic behavior of the settler.

It is known that in order to yield good results, a liquid distributing device at the entrance of a settler must accomplish the following functions:

1) regular distribution of the incoming flow in the two directions, vertical and horizontal, of the stream cross-section of the settler;

2) optimal dissipation of the input energy;

3) reduction in the impact of the secondary currents: density currents, thermal currents;

4) reduction in the impact of the throughput variations;

5) participate in the flocculation of the matter in suspension; and 6) minimize the disturbances of the settled matter lying on the bottom of the settler ("sludge bed").

It is known that fluid jets entering a relatively "stationary" fluid of like nature exhibit the property of transferring some of their momentum to it. This property is manifested through entrainment of a certain mass of the ambient fluid. The jet is then progressively slowed and dispersed at the same time as its field of action broadens, promoted by the lateral extent of the fluid region.

In practice, all devices for feeding reactors and especially settlers are manifested through the formation. of jets. Now, the feed devices are always very small in relation to the dimensions of the reactors. The non-infinite dimension of the reactors prevents the feed jets from spreading in the manner of free jets by virtue of the existence in particular of edge effects due to the walls, of the free surface, etc. The result is that the jets are deflected at the whim of the geometries of the reactors and they thus become the direct cause of poor internal hydraulics.

It is indeed known that the existence of a wall has the effect of limiting the lateral field of the jet. The fluid which is entrained upstream can only be replaced by reverse currents (backflows) originating from downstream and causing the deflection of the jet.

The present proprietor has devoted himself to various numerical simulations making it possible to demonstrate such a phenomenon which has moreover already been observed in certain industrial installations constructed previously.

In FIGS. 1 to 6 of the appended drawings are represented various flow configurations obtained during simulations carried out by the proprietor, of a number of known devices.

FIG. 1 refers to a free-jet feed system. This case does not exist in practice but its study makes it possible to illustrate the fundamental properties of jets (especially entrainment of the ambient fluid, slowing and expansion of the jet, etc.).

FIGS. 2 and 3 refer to a feed system including an inlet via a jet which is more or less centered between two walls. FIG. 2 shows the configuration of the flow obtained with the aid of an off-centred jet. Its deflection is seen to be appreciable. Since a perfectly centred jet cannot be produced in practice, jets having a very small eccentricity (of the order of a few %) have been simulated. The result illustrated by FIG. 3 is at the very least surprising: a very small eccentricity is sufficient for the jet to be deflected fully (toggle system, high instability).

FIG. 4 refers to a jet feed system (spillway) furnished with a siphon unit. The use of such a siphon unit is widespread since, apart from its obvious action of deflecting the entrance jet, it is ascribed supposed advantages such as, in particular, the dissipating of the input energy or the improving of the velocity distribution. The present proprietor has carried out a particularly thorough study of such a device. The conclusion is that in all cases the results obtained are similar to those of more or less off-centred jets.

In all cases, the result is the same: only a small fraction of the cross-section presented to the flow of the fluid is used. The incoming fluid is concentrated there in the form of a deflected jet. The rest of the cross-section is occupied by an induced return current.

BRIEF DESCRIPTION OF THE INVENTION

In order to remedy this phenomenon, the proprietor has thus conceived of constructing a device having two jets off-centered in such a way that the negative effects cancel out. This construction is manifested through flow configurations which are illustrated by FIGS. 5 and 6.

In FIG. 5, the feed device included two symmetric off-centered jets and in the device illustrated by FIG. 6, this device included two identical off-centered jets.

It is seen that this configuration affords an appreciable improvement insofar as a larger fraction of the cross-section presented to the flow is used. However, the result is still very dependent on the relative positions of the jets in the entrance cross-section and above all on their balancing (flow rates and velocities of the two jets). The stronger jet completely absorbs (or inhibits) the weaker jet, so reverting to the case of a single off-centered jet.

It was while researching a technically realizable solution for balancing the two jets that the proprietor discovered a new and totally unexpected fact.

Accordingly, the present invention relates to a settler consisting of a settling tank fed with liquid from a feed channel and a spillway, characterized in that it includes a system for distributing the liquid consisting of a plurality of gauged openings formed respectively in partitions of liquid inlet chambers fed from the said spillway, in such a way that each opening receives a specified fraction of the throughput of the liquid, the said openings being staggered in at least two horizontal rows.

According to one characteristic of the device which is the subject of the invention, the lowest row of horizontal openings is positioned, with respect to the floor of the settling tank at a level chosen in such a way as to avoid the development of a bottom current liable to disturb the bed of settled matter lying on the floor.

According to another characteristic of the invention, the highest row of horizontal openings is positioned with respect to the free surface of the liquid in the settling tank at a level chosen in such a way as to avoid any surface current liable to propagate very far without mixing with the rest of the fluid.

According to the present invention, the device can furthermore include a step, above the floor, the height of which is gauged in such a way as to avoid any disturbance of the bed of settled matter lying on the floor.

Other characteristics and advantages of the present invention will emerge from the description given below with reference to the appended drawings which illustrate an example embodiment thereof devoid of any limiting character. In the drawings:

DETAILED DESCRIPTION OF INVENTION

Figure 7:
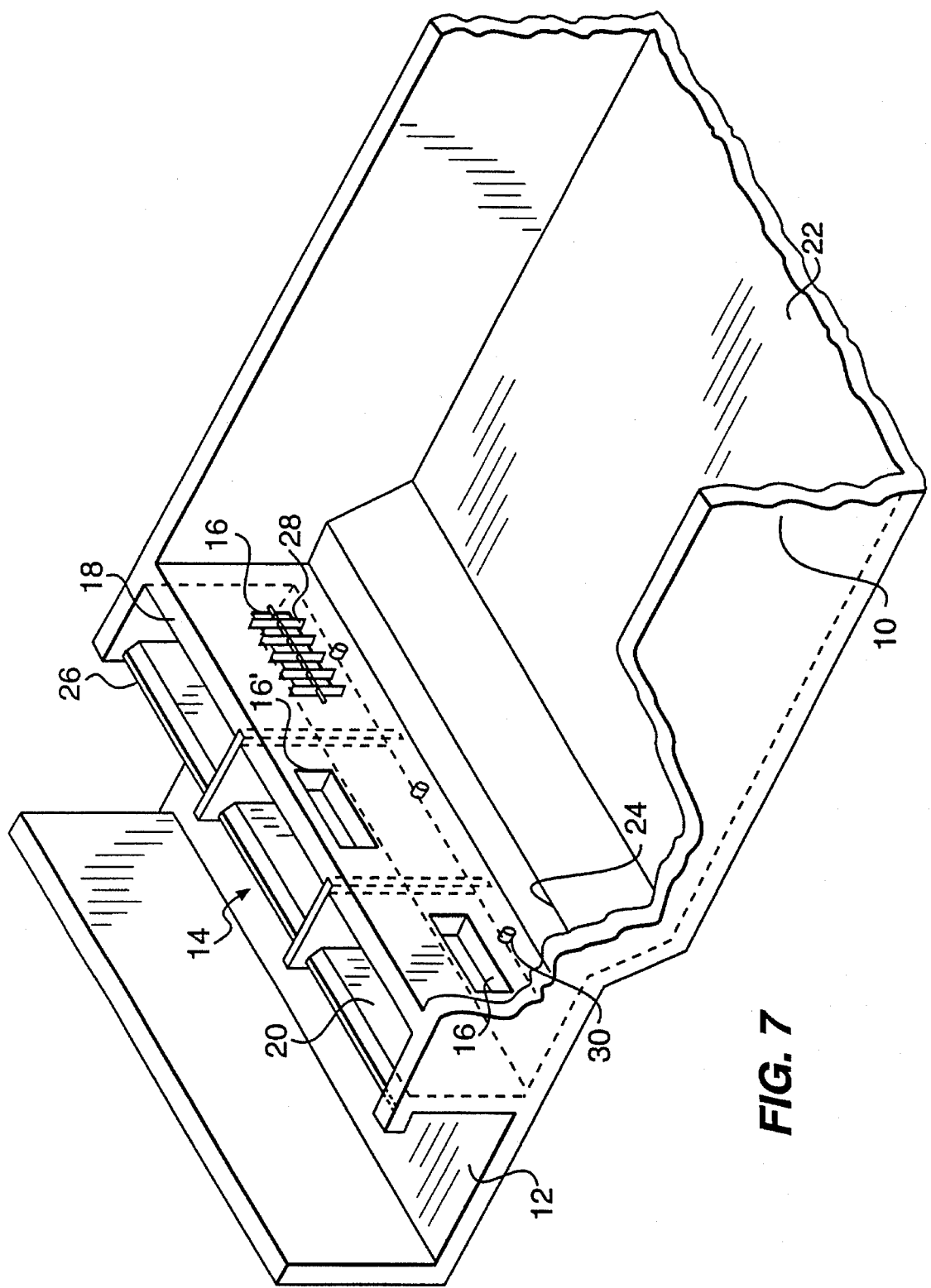
FIG. 7 is a partially cut-away diagrammatic perspective view of an enhanced rectangular settler according to the present invention.
Figure 8:
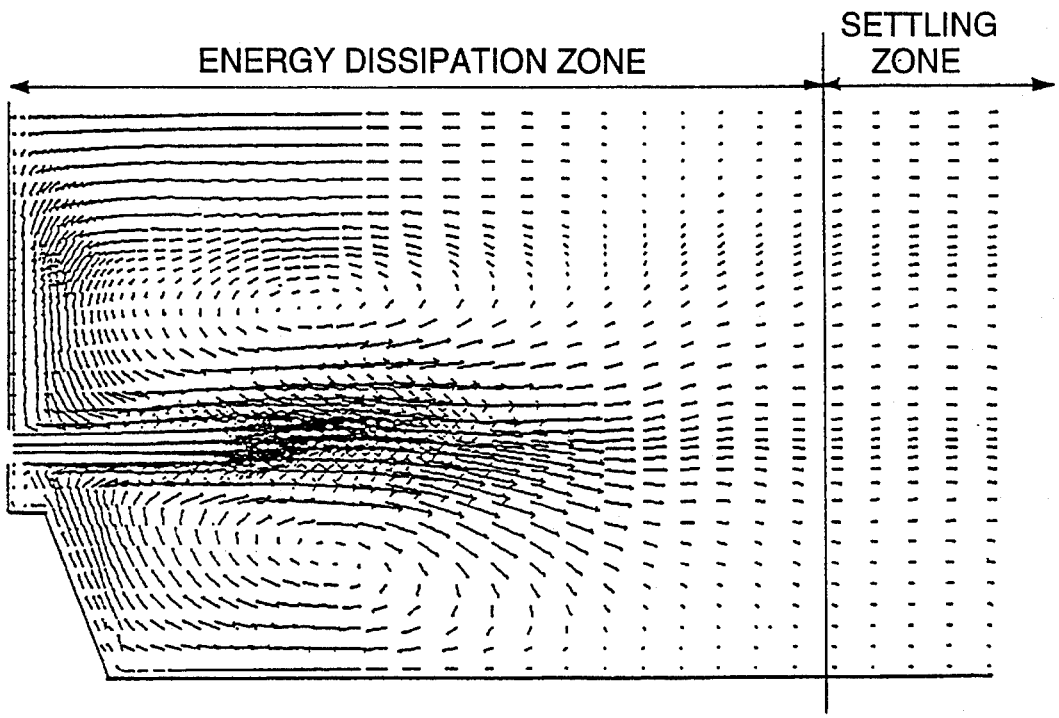
FIGS. 8 to 15 represent the flow configurations obtained by virtue of the device which is the subject of the present invention.

Referring to FIG. 7, it is seen that the rectangular settler represented in this figure is fed with liquid via a feed channel 12. This feed channel feeds a plurality of energy dissipation and inlet chambers such as 20, via a spillway system designated as a whole with the reference 14.

To the side of the settling tank 10, the feed chambers such as 20 are provided with a wall 18.

According to the present invention, the system for distributing the liquid consists of a plurality of gauged openings formed in the wall 18 in a staggered arrangement. Each of these openings receives a clearly determined fraction of the throughput by way of an energy dissipation and inlet chamber, such as 20. As seen in FIG. 7, this distributing system comprises:

a row of upper openings such as 16' and, a row of lower openings such as 16, staggered with respect to the openings 16' of the upper row.

Each of the energy dissipation and inlet chambers such as 20 is preferably fed with liquid through the channel 12, via an adjustable overflow such as 26. Each opening 16-16' can be furnished with means such as 28 enabling the liquid to be distributed while homogenizing and directing the velocities of the jet at its exit from the corresponding opening, this system possibly being adjustable on site.

Figure 16:
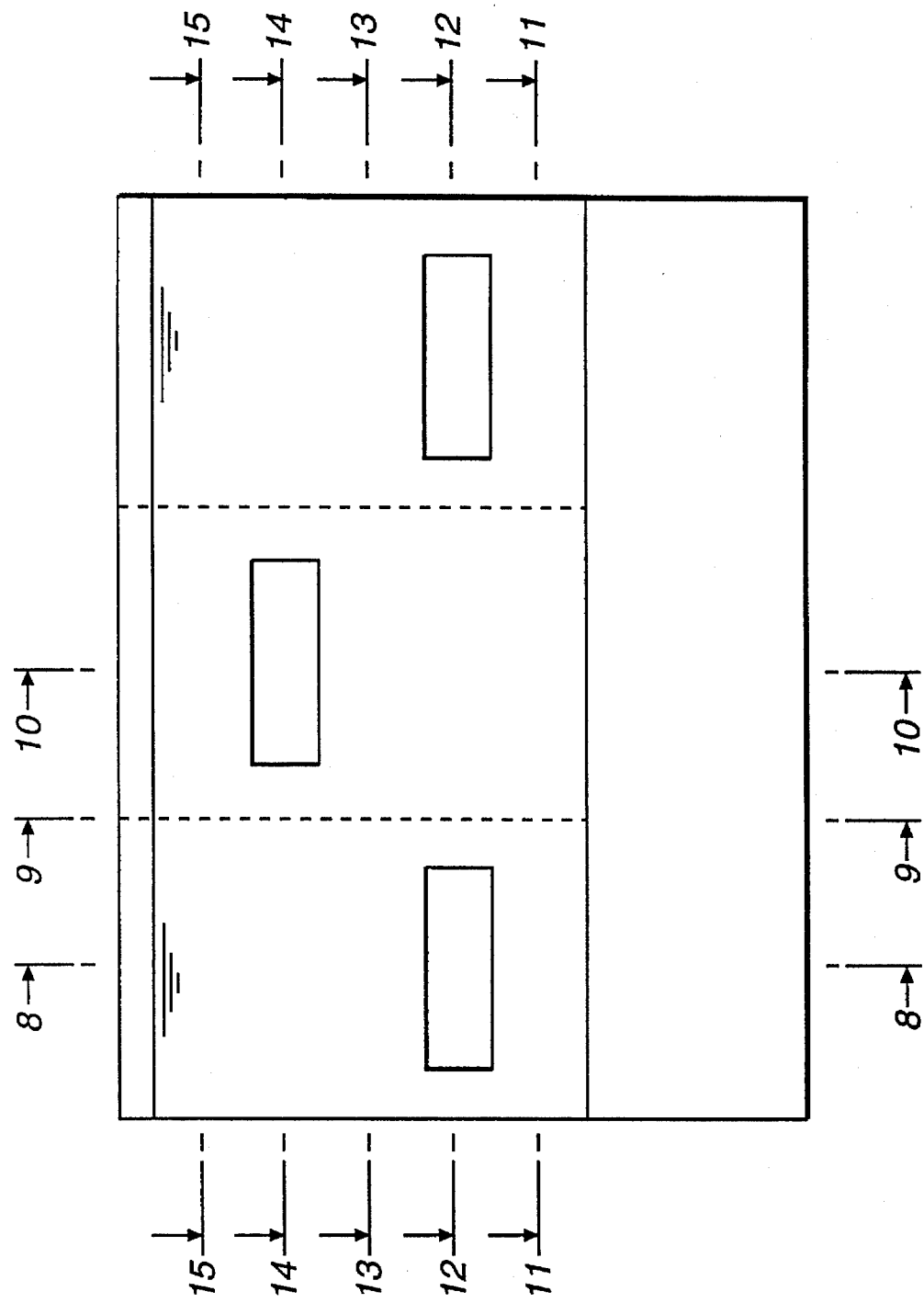
FIG. 16 is a diagrammatic sectional view through a vertical plane of the settling tank. In this section have been marked the various planes of FIGS. 8 to 15.

According to the present invention, the lowest row is positioned with respect to the floor 22 in such a way as to avoid the development of a bottom current liable to disturb the bed of settled matter lying on the floor ("sludge bed"). Preferably, this lower row of openings 16 is arranged at a height of between $\frac{1}{3}$ H and $\frac{2}{3}$ H, H being the height of the liquid in the plant (see the diagram of FIG. 16).

According to another characteristic of the invention, the upper row of openings 16' is positioned in such a way as to avoid the risk of any surface current extending too far, without the possibility of mixing with the rest of the fluid contained in the tank 10. Preferably, this upper row of openings 16' is arranged at a height greater than $\frac{2}{3}$ H and sufficiently below the free surface of the liquid contained in the settling tank.

According to the present invention, the distributing device described above can be supplemented with a step 24 whose height is gauged in such a way as to avoid any disturbance of the bed of settled matter lying on the floor 22.

In a known manner, each of the energy dissipation and inlet chambers such as 20 is provided with a drain orifice 30.

Figure 1:
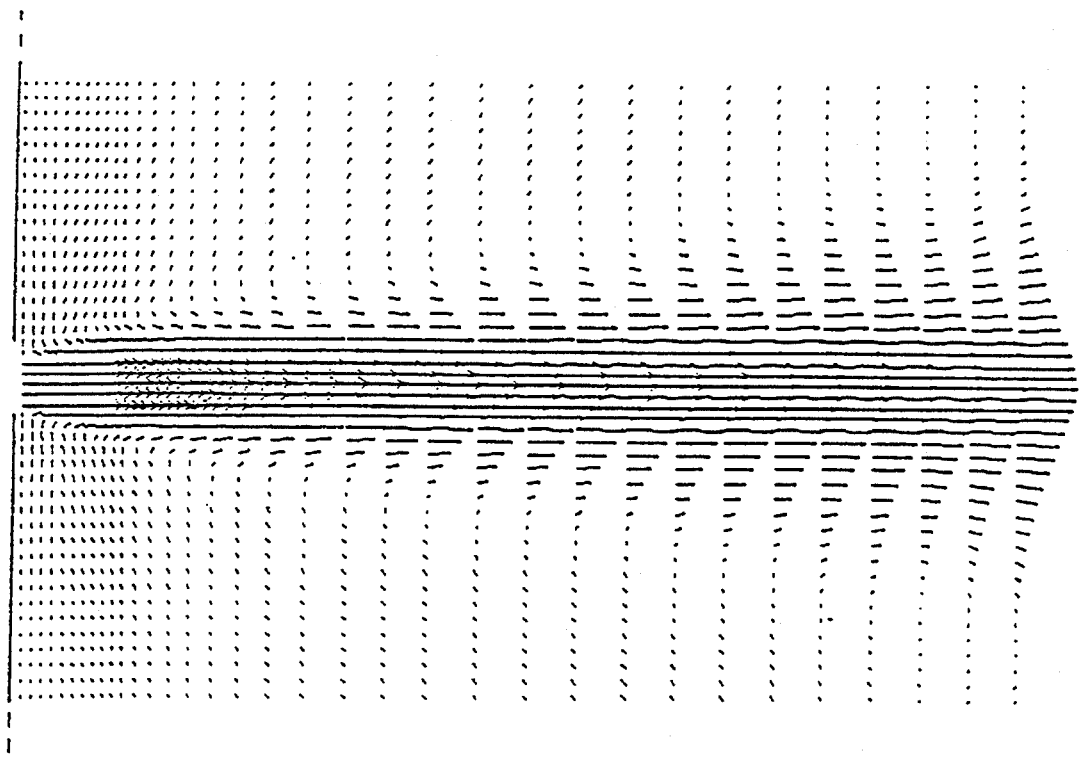
FIGS. 1 to 6 illustrate the flow configurations to which reference was made in the preamble of the present description.
Figure 2:
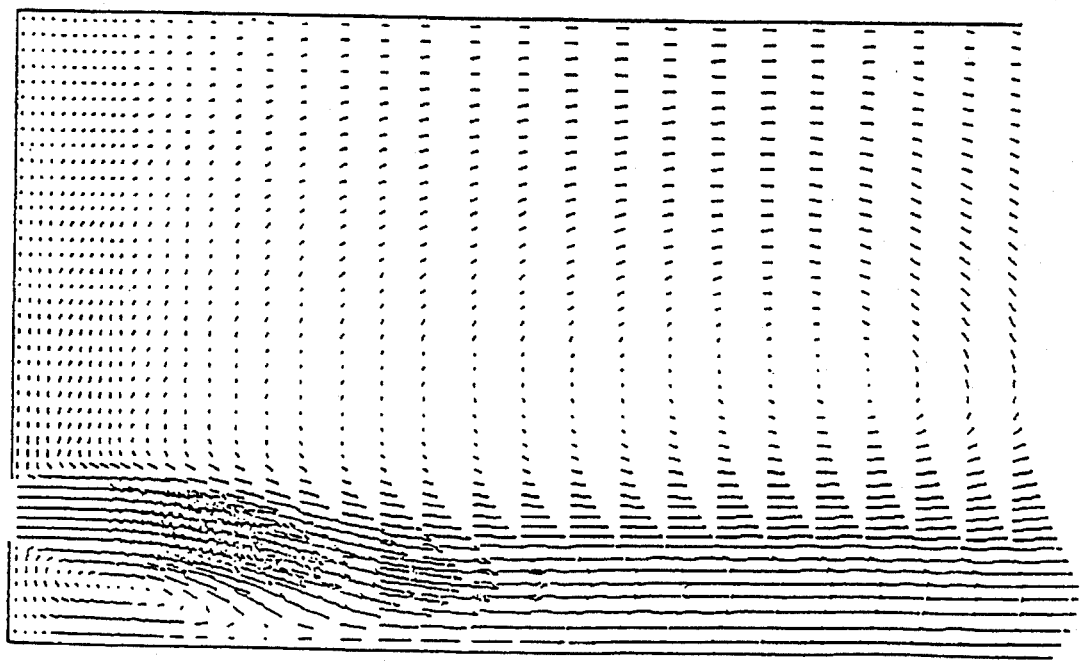
Figure 3:
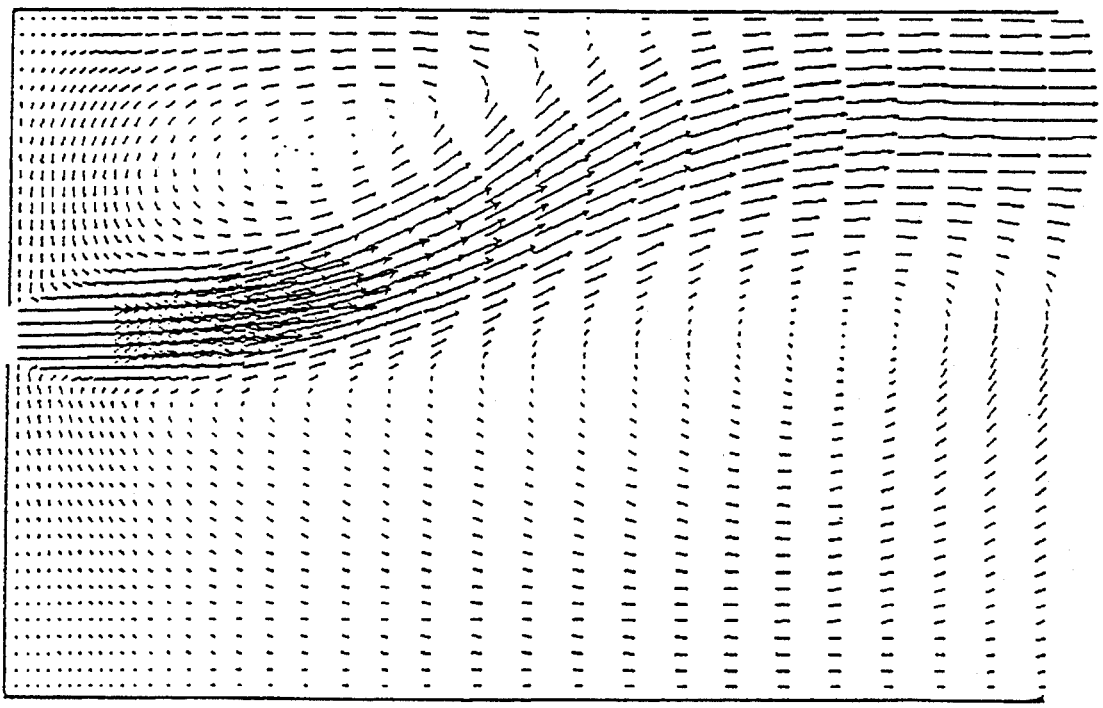
Figure 4:
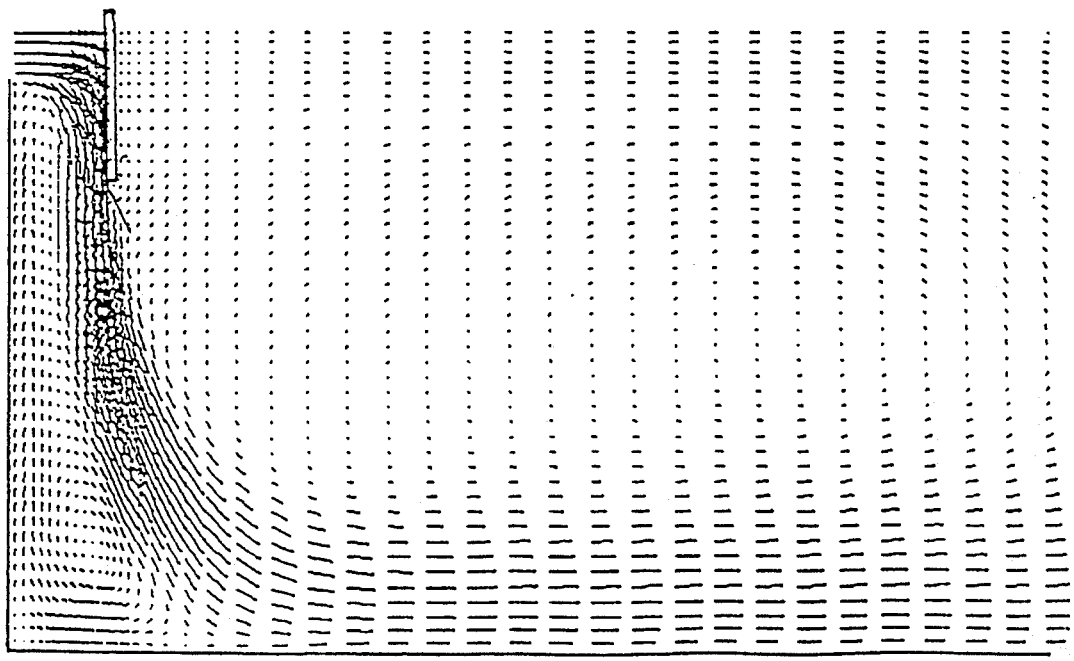
Figure 5:
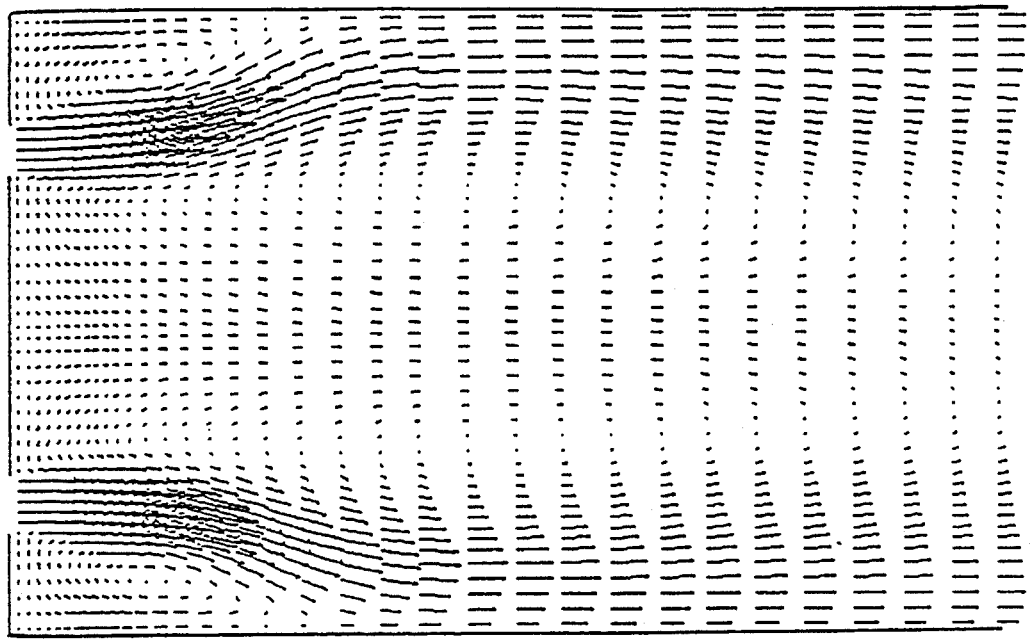
Figure 6:
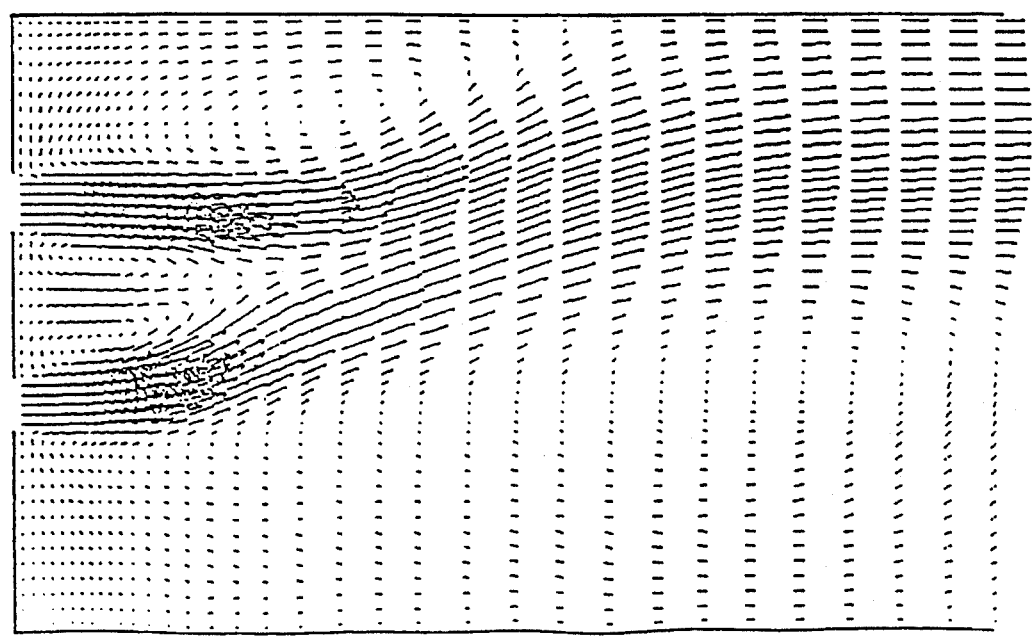

As may be understood, the principle underlying the above-described distributing device according to the invention, consists in breaking up each of the two off-centred jets (of the type of the feed system illustrated by FIGS. 5 and 6) into several discontinuous jets which are easily controllable by virtue of the presence of the spillways such as 26 aligned upstream of the distributing system.

This configuration gives rise to three-dimensional recirculation currents and a radical alteration to the structure of the flow. In contradistinction to all the configurations already examined, and to which the above-explained FIGS. 1 to 6 refer, the jets, without undergoing noticeable deflection, spread practically uniformly in all directions, occupying almost the entire cross-section presented to the flow. The vortex zones are limited to a small distance from the entrance, thus creating a mixing zone favourable to the flocculation of the matter in suspension.

Figure 9:
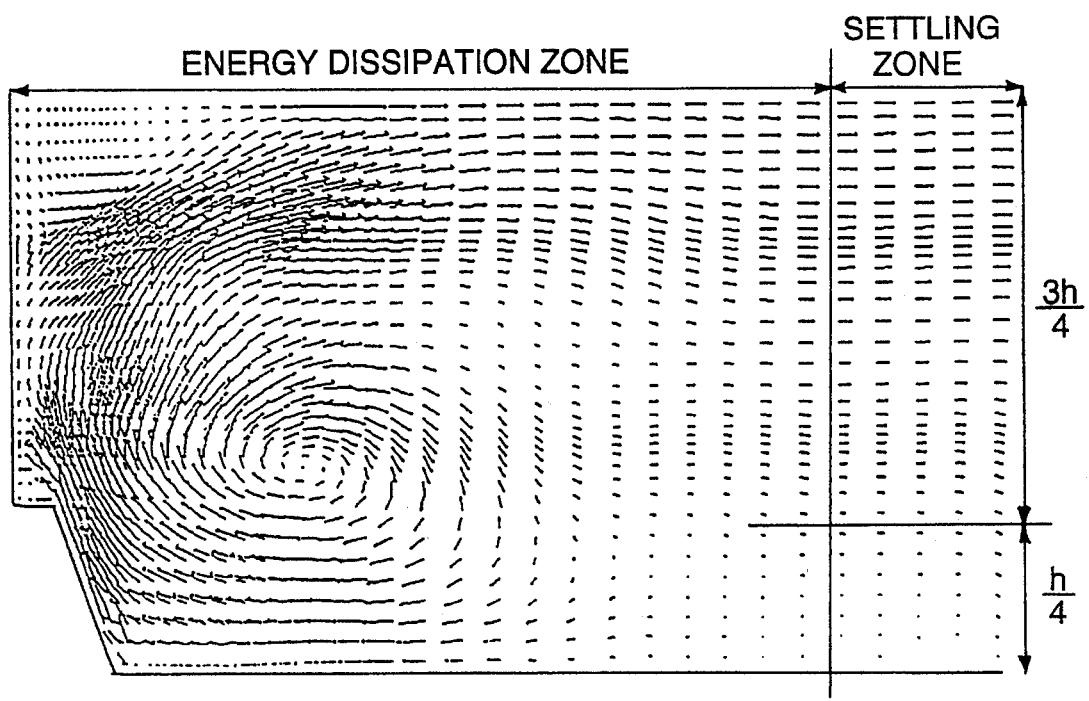
Figure 10:
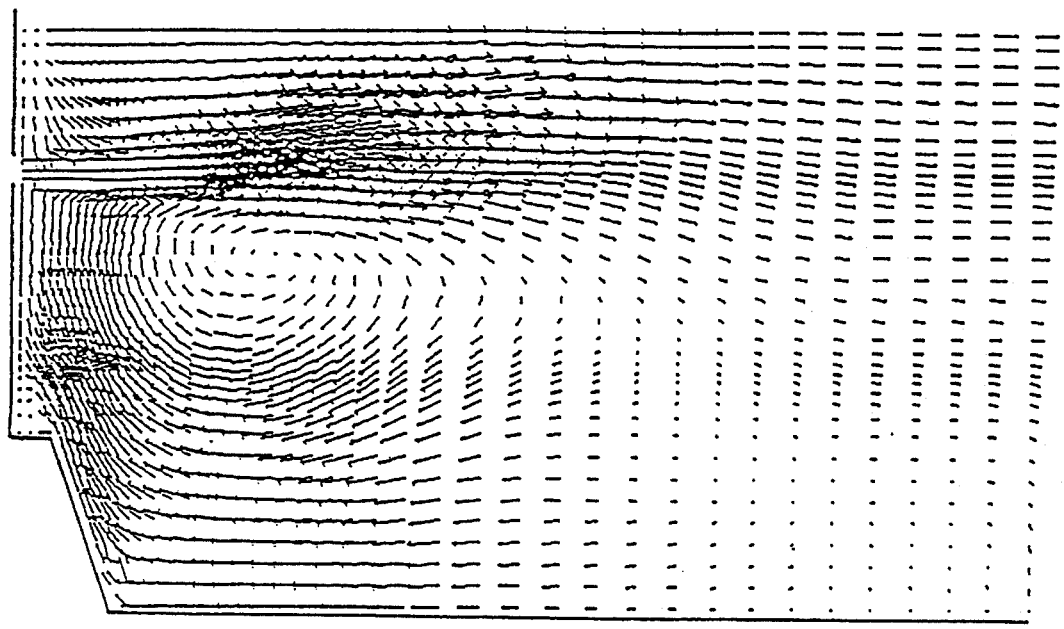
Figure 11:
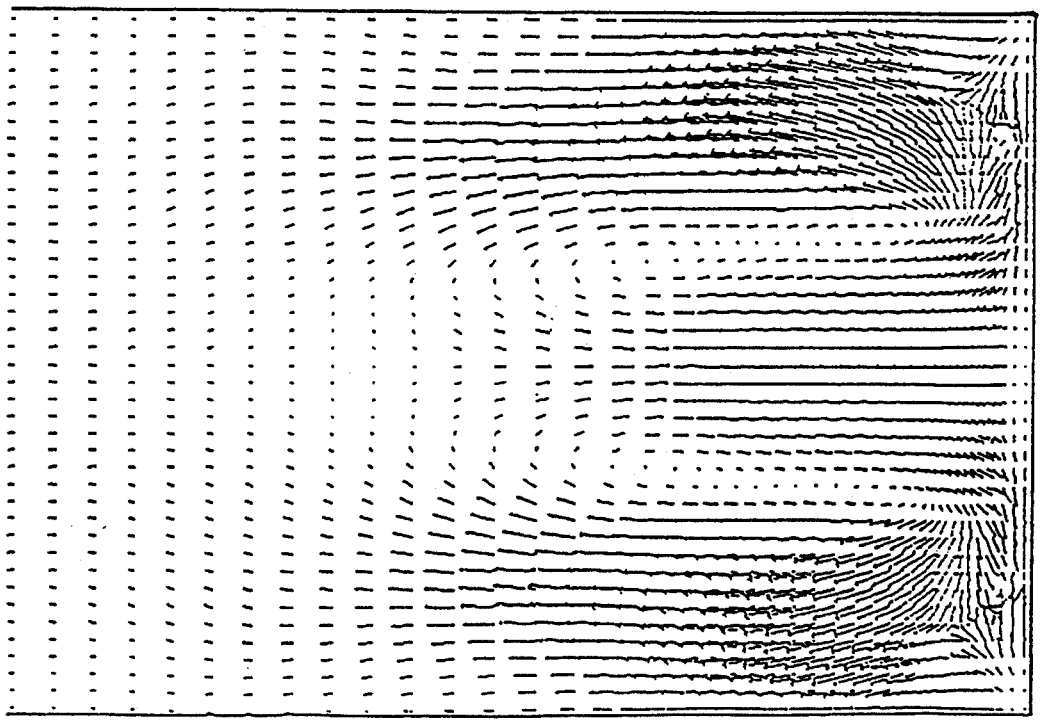
Figure 12:
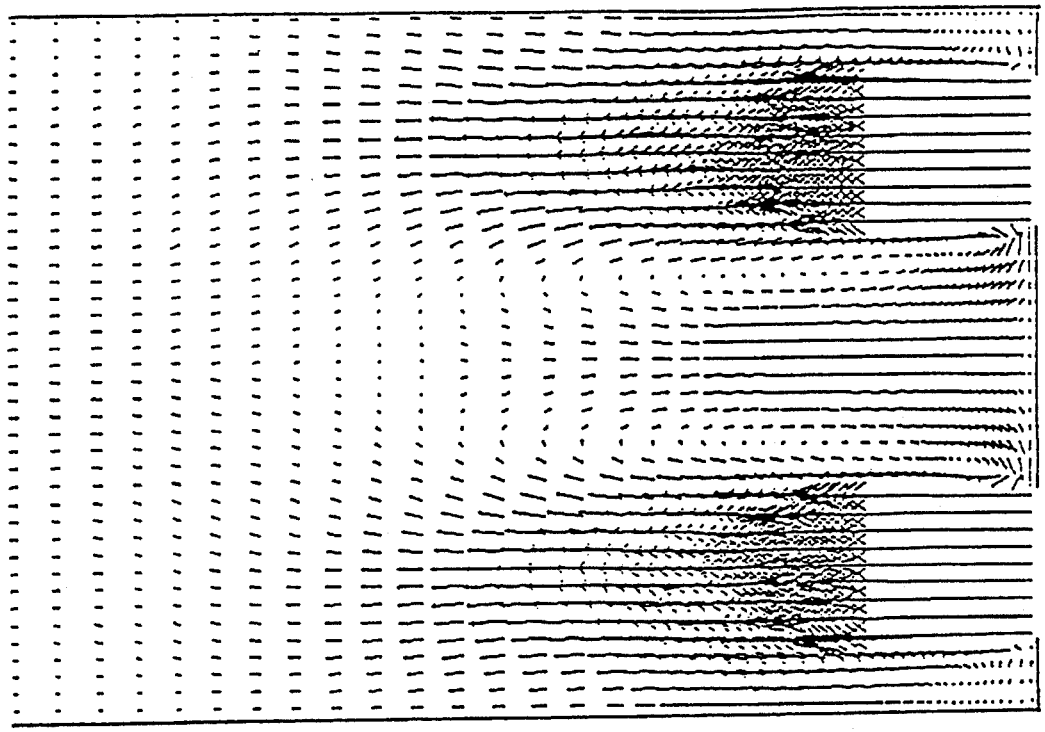
Figure 13:
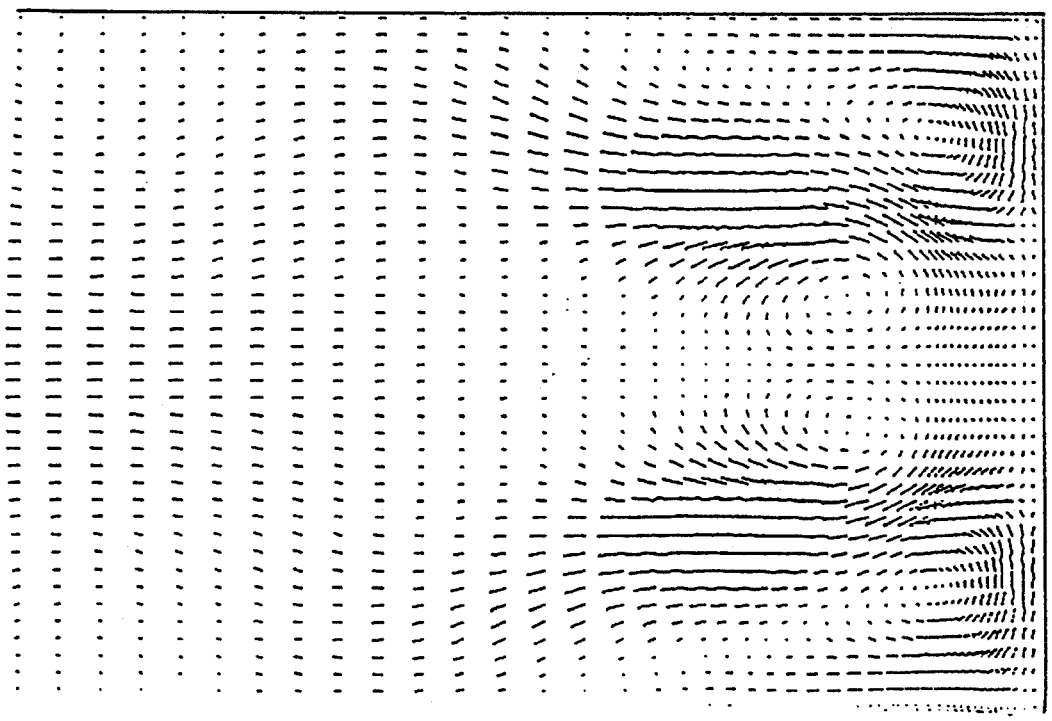
Figure 14:
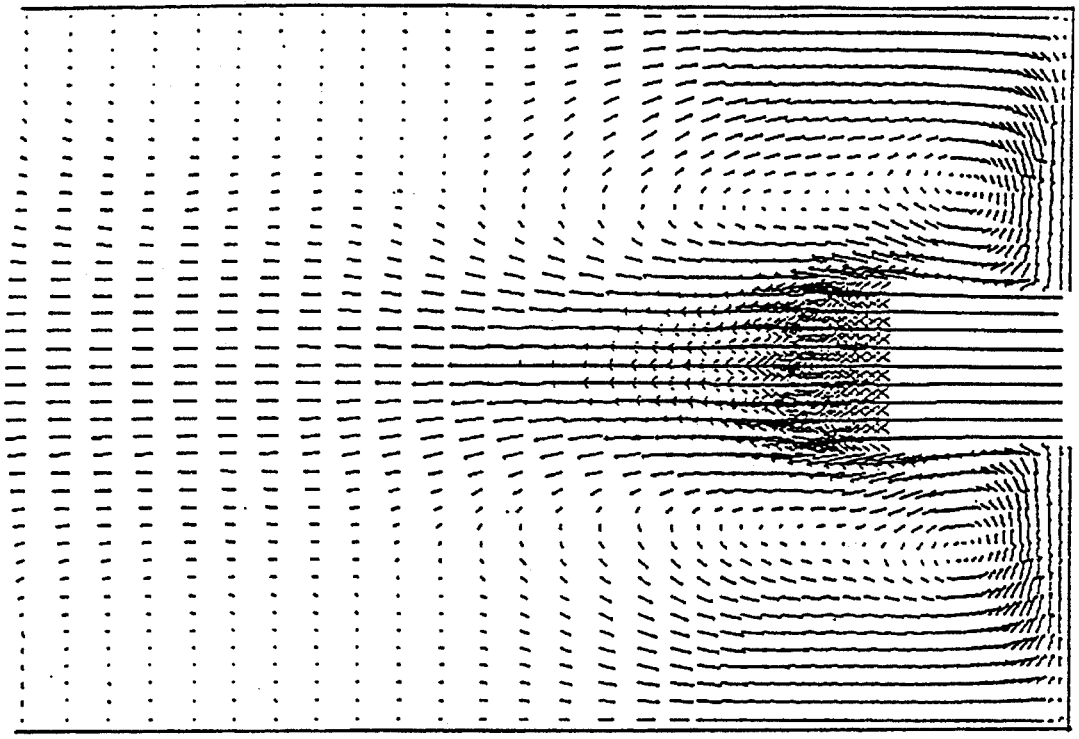
Figure 15:
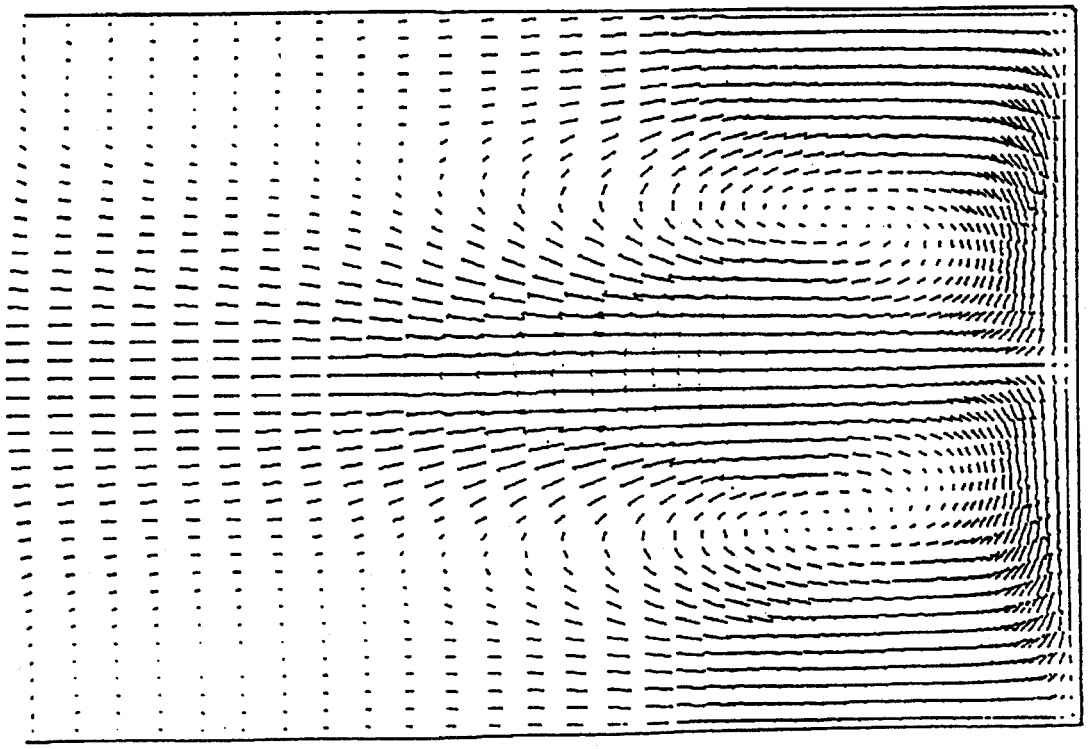

FIGS. 8 to 15 illustrate the flow configurations obtained by virtue of the distributing system represented in FIG. 7. The planes of these figures have been specified in FIG. 16. Examination of FIGS. 8 to 15 confirms the results afforded by the invention and elucidated above. For example, FIG. 9 illustrates that the invention limits mixing of a surface current with the rest of the liquid upon initial flow propagation in the tank whereby the mixing results in energy dissipation of the flow, thereby creating a flow rate in a final settling zone at a height less than $\frac{1}{4}$ H, while creating a higher and more uniform flow rate in the settling zone at a height above $\frac{1}{4}$ H.

Among the advantages afforded by the device which is the subject of the present invention, will be mentioned, in particular, the following:

very fast regulating of the velocities of the jet throughout the cross-section of the plant;

a reduction in the plant-floor velocities manifested by the fact that the settled matter (sludge bed) is not disturbed;

natural dissipation of the input energy by virtue of the interaction between the jets;

creation of a mixing zone limited to the entrance of the plant;

secondary-current minimization obtained through the immediate mixing of the incoming fluid with the ambient fluid;

distribution which is insensitive to variations in the throughput, obtained by virtue of the presence of the spillways such as 26 which enables each opening 16, 16' of the distributing device to receive a determined fraction of the throughput.

All these advantages emerge clearly from examining FIGS. 8 to 15. They enable settling to be improved by increasing the overall efficiency of the settler.

Moreover, the absence of obstacles (siphon units) inside the plant simplifies the removing of flotsam and the scraping of the bottom, thus decreasing the overall cost of the installation. This cost is further reduced by virtue of the simplicity of the construction of the device according to the invention and by reason of the fact that it requires practically no maintenance.

It remains evident that the present invention is not limited to the example embodiment described and represented, but that it encompasses all variants thereof. Thus, in the example embodiment described and represented here the settling tank has a rectangular shape, but however, this tank can have any other shape or geometrical configuration, in particular square, circular or. other.

I claim:

1. A settler for liquid treatment installations including a settlement tank fed with liquid from a feed channel having a wall thereof serving as a spillway, the settler including a system for distributing the liquid and comprising:

a plurality of separated inlet chambers longitudinally positioned along the feed channel, a first wall of the inlet chambers defined by the spillway and fed from the spillway;

a tank wall located in spaced parallel relation to the spillway and defining a second wall of the inlet chambers;

a plurality of differently gauged and vertically mutually staggered openings formed in the second wall, each opening receiving a fraction of liquid flowing from a corresponding inlet chamber to the tank;

the openings being positioned in at least two horizontal rows, and respective columns aligned with the separated inlet chambers;

a lowest row of openings located at a height of between ⅓ H and ⅔ H, wherein H is the height of liquid in the tank, said location chosen to avoid the development of a bottom current liable to disturb a sediment layer on a floor of the tank; and further wherein a highest row of openings creates a higher flow rate than the lowest row of openings and is located at a height greater than ⅔ H, said location chosen to limit mixing of a surface current with the rest of the liquid upon initial flow propagation in the tank whereby the mixing results in energy dissipation of the flow, thereby creating a flow rate in a final settling zone at a height less than ¼ H, while creating a high and more uniform flow rate in the settling zone at a height above ¼ H.

2. Settler according to claim 1, wherein the system for distributing the liquid furthermore includes a step, above the tank floor, the height of which is gauged in such a way as to avoid any disturbance of bed of settled matter lying on the floor.

3. Settler according to claim 1, wherein each of the said gauged openings comprises means for adjustment and distribution of the velocity of a corresponding jet.

4. Settler according to claim 1, wherein each of the said inlet chambers is fed with liquid from the feed channel, by way of an adjustable overflow weir.

* * * * *